SERIAL TO PARALLEL CONVERTER FOR DATA SIGNALS

Filed May 28, 1963

2 Sheets-Sheet 1

INVENTOR
N. H. STOCHEL
BY R C Lipton
ATTORNEY

SERIAL TO PARALLEL CONVERTER FOR DATA SIGNALS

Filed May 28, 1963 2 Sheets-Sheet 2

United States Patent Office 3,160,876

Patented Dec. 8, 1964

3,160,876

SERIAL TO PARALLEL CONVERTER FOR DATA SIGNALS

Nathan H. Stochel, New York, N.Y., assignor to Bell Telephone Laboratories, Incorporated, New York, N.Y., a corporation of New York Filed May 28, 1963, Ser. No. 283,825
8 Claims. (Cl. 340—347)

This invention relates to data transmission systems and, more particularly, to systems for accepting data signals in serial form and converting the signals to parallel form.

A broad object of this invention is to provide an improved serial-to-parallel converter for data signals.

In data transmission systems, the conventional communication language comprises data words or characters, each of the characters having a plurality of binary elements. The communicating data sets may operate asynchronously and transmit the character elements serially. To delineate each character, a start-stop code is employed wherein the first element of each character is invariably a spacing signal, sometimes called a start signal, and the last element is invariably a marking signal, sometimes called a stop signal.

The data sets, in accordance with the requirements of data set subscribers, may employ various permutation element codes. To interconnect two such otherwise incompatible sets, code translation is required. Code translators, however, are generally arranged to accept the character elements in parallel form.

In a preferred arrangement, the serial elements of each character are stored in a shift register to be read out in parallel by the translator. The read in and read out of the shift register is controlled by a timing circuit which, in response to the leading edge of the start signal, scans the theoretical midpoint of each element, stores the scanned element in the shift register and reads out the stored elements at the end of the character interval. However, line interference in the form of a momentary line hit may be recognized by the timing circuit as the leading edge of the start signal thereby resulting in the storage of a simulated character in the shift register. Moreover, prolonged noise simulating spacing signals will garble the received character elements.

Accordingly, it is an object of this invention to discriminate between line interference or noise and correctly received signals.

It is another object of this invention to provide an indication that the signals are garbled by noise.

In accordance with a feature of this invention, the start signal must be read into the shift register to permit read out of the stored signals.

In accordance with another feature of this invention, the read out of the stored signals is precluded when the stop signal is garbled by noise.

In accordance with a further feature of this invention, a predetermined character is coded on the translator output leads, when the stop signal is garbled, to indicate an invalid character.

Figures 1, 3:
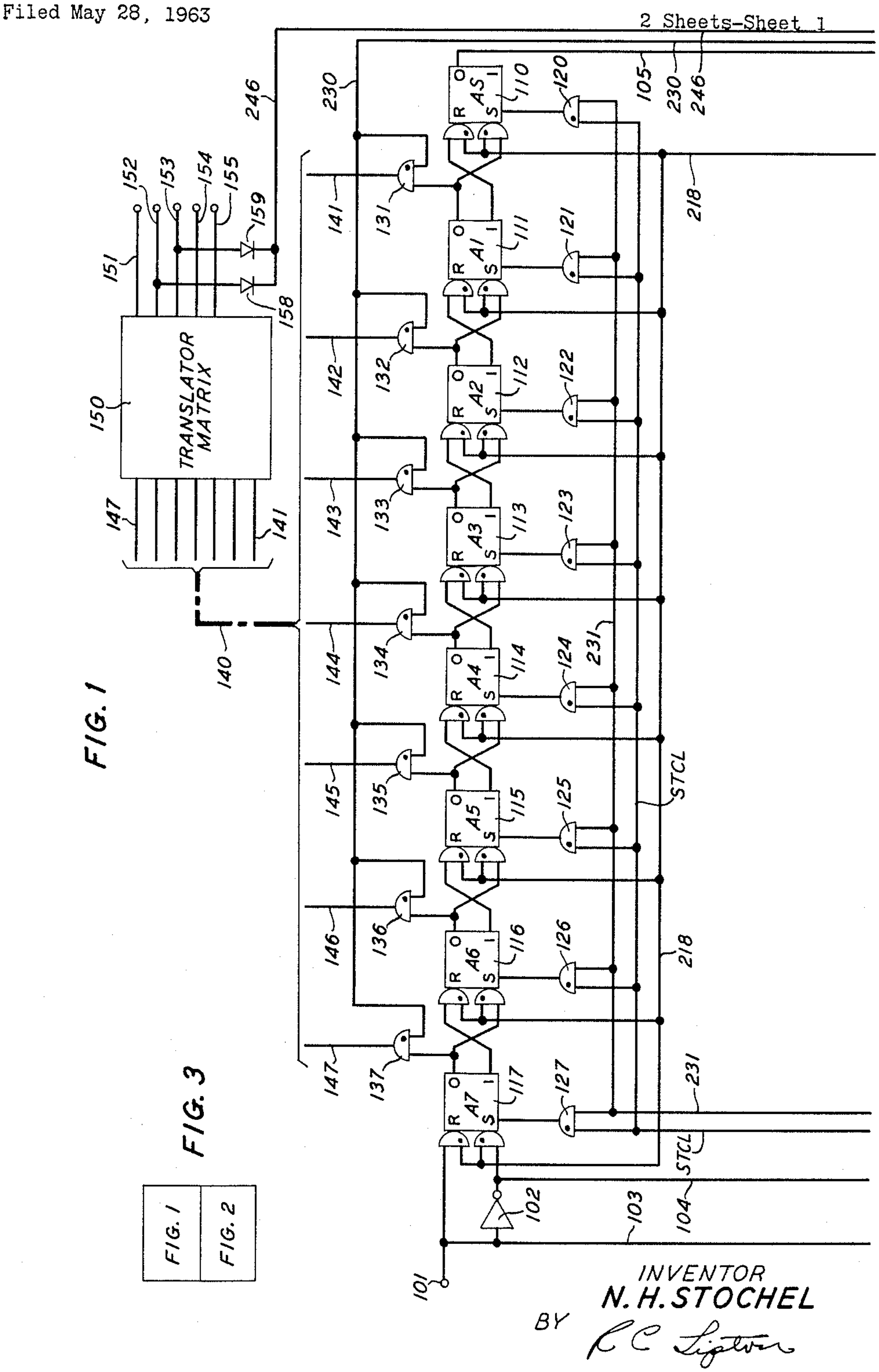
Figure 2:
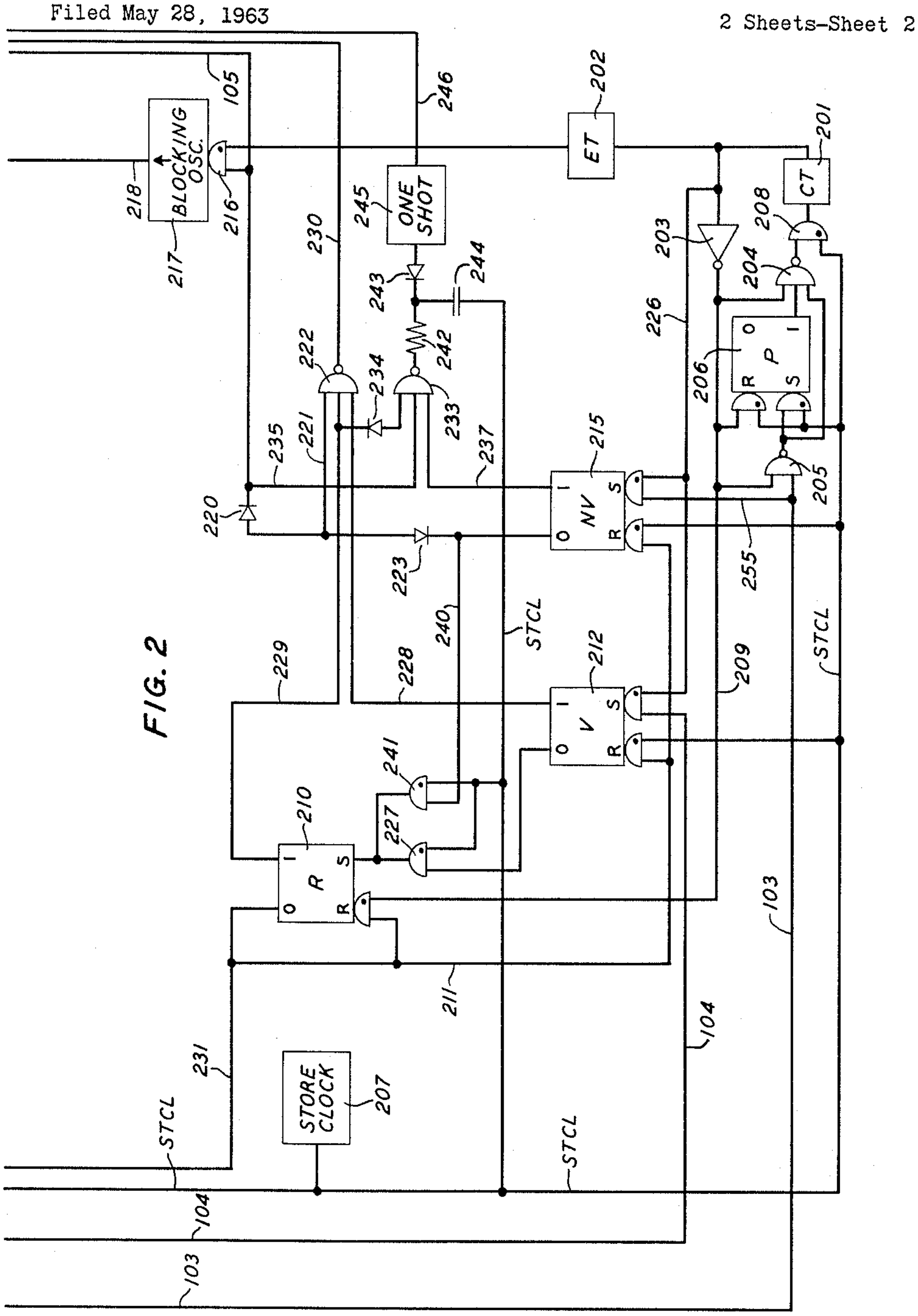

The foregoing and other objects and features of this invention will be fully understood from the following description of an illustrative embodiment thereof taken in conjunction with the accompanying drawing wherein:

FIGS. 1 and 2, when arranged as shown in FIG. 3, show the details of circuits and equipment which cooperate to form a serial-to-parallel converter in accordance with this invention.

Referring now to FIG. 1, incoming start-stop signals are received at terminal 101. The start-stop code comprises a first spacing start element, seven succeeding marking or spacing information elements, and a concluding marking stop element. In accordance with the embodiment disclosed herein, each marking element comprises a positive or high potential condition and each spacing element comprises a ground or low potential condition.

Terminal 101 extends to the enabling input of the gate connected to the reset input of flip-flop 117. In addition, terminal 101 extends through inverter 102 to the enabling input of the gate connected to the set input of flip-flop 117.

Inverter 102 functions to provide a low condition signal in response to the application of a high condition signal thereto and a high condition signal in response to the application of a low condition signal. The reset input gate of flip-flop 117 and each of the other gates described hereinafter, shown by the same symbol, functions to gate a negative impulse applied to the input lead extending to the dot in the symbol when the other input lead is in a low condition and to block the negative impulse when the other input lead is in a high condition.

Accordingly, received spacing elements apply a low condition to the reset input gate of flip-flop 117 to enable the gate and received marking elements apply a low condition potential to the set input gate of flip-flop 117 to enable the latter gate.

Flip-flop 117, together with flip-flops 110 through 116, constitutes a shift register. In the initial condition, all of the flip-flops in the shift register are in the set condition. Under this condition, output terminal 1 of each of flip-flops 110 through 117 is in the high signal condition and output terminal 0 is in the low signal condition. With flip-flop 117, for example, in the set condition, a negative impulse to the reset terminal resets the flip-flop. In the reset condition, output terminal 1 of the flip-flop is in the low signal condition and output terminal 0 is in the high signal condition. It is noted that, with flip-flop 110 in the normal set condition, a low condition is provided at the 0 output terminal thereof, which condition is applied through lead 105 to gate 216, FIG. 2, to inverter gate 233 by way of lead 235 and to inverter gate 222 by way of diode 220. The function of gates 216, 222 and 233 is described hereinafter.

Terminal 101 also extends by way of lead 103 to inverter gate 205, FIG. 2. The output of inverter gate 205 is maintained in the high signal condition when at least one of its inputs is in the low signal condition. During the idle marking condition a high signal condition is applied to one input of gate 205 by way of lead 103. The other input to inverter gate 205 is provided by the output of inverter 203. The input to inverter 203, in turn, is connected to character timer 201 whose output is normally in the low signal condition. Accordingly, both of the inputs to inverter gate 205 are in the high signal condition whereby a low signal condition is applied to the enabling input of the input set gate of flip-flop 206, thereby enabling the gate. In addition, the low signal output condition of inverter gate 205 is extended to one input of inverter gate 204. Since at least one input of inverter gate 204 is in the low signal condition, a high signal condition is provided at the output thereof, which high signal condition disables gate 208.

The output of gate 208 is connected to the input of character timer 201. Character timer 201 constitutes a monostable multivibrator having a recycling time corresponding to the duration of a code character. In the initial idle condition, the output of character timer 201 is in the low signal condition. The application of a negative pulse to character timer 201 initiates the operation of the timer whereby a high signal condition is provided at the output thereof for almost the character interval. The low signal condition is then re-established at the output of character timer 201 during part of the stop element of the character.

One output of character timer 201 extends to the input of inverter 203, as previously described. Accordingly, during the idle marking condition, a low condition at the output of character timer 201 produces a high condition at the output of inverter 203, which high condition is provided to one input of inverter gate 205, to one input of inverter gate 204, to the enabling input of the input reset gate of flip-flop 206, and to the pulsing input of the input reset gate of flip-flop 210.

The output of character timer 201 also extends to the input of element timer 202. Element timer 202 comprises a free-running multivibrator which is disabled by the application of a low condition signal thereto. Accordingly, in the idle marking condition, element timer 202 is disabled by character timer 201. When the operation of character timer 201 is initiated, however, the low condition is removed from the input of element timer 202 and element timer 202 proceeds to oscillate.

The recycling of element timer 202 is arranged to correspond to the interval of the character elements whereby a pulse is produced for each character element, the first pulse occurring after a delay of approximately one-half of a character element. Accordingly, when the operation of character timer 201 commences, as previously described, element timer 202 will generate a pulse at approximately the midpoint of the start element and a pulse at approximately the mid point of each of the succeeding information elements.

As previously described, during the idle marking condition, gate 205 provides a low signal enabling potential to the input set gate of flip-flop 206. The pusing input to the input set gate of flip-flop 206 is connected by way of lead STCL to a store clock, generally indicated by block 207. Store clock 207 comprises a free-running multivibrator providing continuous pulses at a rate substantially higher than the signaling rate. Accordingly, a clock pulse provided by way of lead STCL to the input set gate of flip-flop 206 sets the flip-flop. The resultant high signal condition provided at output terminal 1 of terminal 206 is extended to inverter gate 204. Accordingly, the inputs of inverter gate 204 from flip-flop 206 and inverter gate 203 are in the high signal condition. The reception of a start signal now provides a low signal condition to lead 103. This low signal condition when applied to gate 205 results in a high signal condition at the output thereof. A high signal condition is therefore applied to the third input of inverter gate 204, thereby extending an enabling potential to gate 208. The next clock pulse is thus passed through gate 208 to character timer 201, initiating the operation of the character timer.

Upon the initiation of the operation of character timer 201, the positive-going transition at the output thereof provides a negative-going transition at the output of inverter 203. This negative-going transition is applied through lead 209 to the pulsing input of the reset input gate of flip-flop 210. Since the enabling input of the reset input gate of flip-flop 210 is connected to the 0 output terminal of the flip-flop, a reset pulse is applied to flip-flop 210 to place it in the reset condition if the flip-flop was previously in the set condition. The output terminal 1 of flip-flop 210 is thus placed in the low signal condition, which condition is passed by way of lead 229 to inverter gate 222 and by way of diode 234 to inverter gate 233. The functions of gates 222 and 233 are described hereinafter.

The positive potential provided at the output of character time 201, upon its initiation thereof, and the consequent negative potential provided at the output of inverter 203 are also applied to inverter gates 204 and 205 and enables the input reset gate of flip-flop 206. Consequently, inverter gate 204 applies a high potential disabling signal to gate 208 and inverter gate 205 provides a high potential disabling signal to the input set gate of flip-flop 206. Accordingly, the next clock pulse on lead STCL passes through the input reset gate of flip-flop 206 to reset the flip-flop.

The removal of the low potential at the output of character timer 201, as previously described, initiates the operation of element timer 202. Accordingly, element timer 202 starts to oscillate, applying pulses to the input pulsing lead of gate 216. The other input to gate 216 is connected by way of lead 105 to the 0 output terminal of flip-flop 110. Since flip-flop 110 is normally in the set condition, as previously described, the consequent low signal condition applied to lead 105 enables gate 216. Accordingly, the element timing pulses are passed through gate 216 to a blocking oscillator, generally indicated by block 217. Blocking oscillator 217, in turn, provides a negative impulse to lead 218 in response to each element timer pulse applied thereto.

The first element pulse applied to lead 218 occurs at the midpoint of the starting element, as previously described. Lead 218 extends to the pulsing inputs of the input reset gate and the input set gate of flip-flop 117. Similarly, lead 218 is connected to the pulsing inputs of the input reset and input set gates of flip-flops 110 through 116. Since the start element is being applied to terminal 101 when the first element timing pulse is generated, the input reset gate of flip-flop 117 is enabled and the element timing pulse resets the flip-flop. This corresponds to the storing of the spacing start element in flip-flop 117.

The second element timing pulse occurs at the midpoint of the first information element. With flip-flop 117 now in the reset condition, the low signal condition at output terminal 1 enables the reset input gate of flip-flop 116 while the high condition at terminal 0 disables the set gate of flip-flop 116. Accordingly, the second element timer pulse sets flip-flop 116 to store the start element therein.

If the first information element at this time is marking, the input set gate of flip-flop 117 is enabled, as previously described, and the second element timing pulse sets flip-flop 117 to store the marking element therein. Conversely, if the first information element is spacing, the input reset gate of flip-flop 117 is enabled, thereby maintaining flip-flop 117 reset. This corresoonds to the storage of the spacing element in flip-flop 117.

Similarly, the third element timing pulse shifts the start element to flip-flop 115, shifts the first information element to flip-flop 116, and applies the second information element to flip-flop 117. Accordingly, the start element and each succeeding information element are shifted down through the shift register by the eight element timing pulses until the start pulse is stored in flip-flop 110 and the seven information elements are stored in flip-flops 111 through 117.

With the start element in flip-flop 110, the flip-flop is reset and output terminal 0 is in the high signal condition. This high signal condition is applied to lead 105 disabling gate 216 and thereby terminating the application of element timing pulses to blocking oscillator 217. This, in turn, terminates the application of shift pulses to the shift register. In addition, the high signal condition on lead 105 removes the low condition previously applied by wal of lead 235 to gate 233 and by way of diode 220 and lead 221 to gate 222.

Near the conclusion of the character, character timer 201 times out, as previously described, restoring the output thereof to the low signal condition. At this time all of the information elements have been received and input terminal 101 has the marking stop element applied thereto. Accordingly, lead 103 is now in the high signal condition.

With the stop element now being received, the positive potential is applied to lead 103, as previously described, applying a disabling potential by way of lead 225 to the input set gate of flip-flop 215. In addition, inverter 102 provides a low signal condition at the output thereof in response to the incoming marking condition. This low signal condition is extended by way of lead 104 to the input set gate of flip-flop 212, whereby the gate is enabled.

Recalling now that character timer 201 produces at the output thereof at the end of the character interval a negative-going transition, this negative-going transition is applied by way of lead 226 to the pulsing inputs of the input set gates of flip-flops 212 and 215. As previously decribed, a received stop signal has disabled the input set gate of flip-flop 215 and enables the input set gate of flip-flop 212. Accordingly, flip-flop 212 is set. With flip-flop 212 set, a low signal enabling potential is applied from the 0 output terminal thereof to gate 227. In addition, a high signal condition is provided from the output terminal 1 thereof to an input of gate 222.

Since the input set gate of flip-flop 215 is disabled, the flip-flop is not set. With flip-flop 215 maintained in the normal reset condition, the low condition provided at the output terminal 1 is maintained, which low condition is passed through lead 237 to inverter gate 233.

Recalling now that character timer 201 is restored to the low signal condition, the consequent high signal condition provided at the output of inverter 203 is passed to inverter gate 205. Accordingly, as previously described, the input set gate of flip-flop 206 is enabled.

Under the conditions that flip-flop 212 is set and the input set gate of flip-flop 206 is enabled, the next store clock pulse sets flip-flop 206, as previously described, and, in addition thereto, is passed through gate 227 to the input set terminal of flip-flop 210, whereby flip-flop 210 is placed in a set condition. The consequent high signal condition provided at the output terminal 1 of flip-flop 210 is passed by way of lead 229 to inverter gate 222. Accordingly, all of the inputs to inverter gate 222 are placed in the high signal condition resulting in the application of a negative-going potential transition to lead 230. Lead 230, in turn, is connected to the pulsing input terminals of gates 131 through 137.

The enabling lead to gate 137 is connected to the 0 output terminal of flip-flop 117. If flip-flop 117 is in the reset condition, a high condition disabling potential is thereby applied to gate 137. Conversely, if flip-flop 117 is in a set condition, an enabling potential is applied to gate 137. Accordingly, the negative-going transition provided by gate 222 is passed through lead 230 and gate 137 to lead 147 if a marking element is stored in flip-flop 117. Gates 131 through 136 are similarly connected to the 0 output terminals of flip-flops 111 through 116. Thus a negative impulse is passed to each of leads 141 through 146 in the event that a marking element is stored in the associated ones of flip-flops 111 through 116. Accordingly, leads 141 through 147 are selectively coded in parallel by the gated pulse in accordance with the character stored in flip-flops 111 through 117. This converts the serial character elements to parallel elements.

Leads 141 through 147 extend by way of cable 140 to a translator matrix, generally indicated by block 150. Translator matrix 150 may be arranged to convert the seven-element code applied in parallel by leads 141 through 147 to a five-element code by coding output leads 151 through 155 in a manner well known in the art.

Returning now to the placing of flip-flop 210 in the set condition, the low condition provided at the 0 output terminal thereof is passed by lead 211 to its own input reset gate and to the input reset gates of flip-flops 212 and 215. In addition, the low condition output of the 0 output terminal of flip-flop 210 is also passed by way of lead 231 to gates 120 through 127. The next clock pulse thus resets flip-flop 212. The clock pulse is also applied to the reset gate of flip-flop 215. Flip-flop 215, however, is reset at this time so that no change of condition is provided. In addition, the clock pulse is applied by way of lead STCL through gates 120 through 127. Since these gates have been enabled by flip-flop 210, the clock pulse is passed through gates 120 through 127 to the input set terminals of flip-flops 110 through 117. Thus flip-flops 110 through 117 are restored to their initial set condition. The circuit is thus in the initial condition awaiting the arrival of the next start element, whereupon flp-flop 210 is reset, as previously described.

Interference, such as noise, may be interpreted as low condition or spacing signals. When the noise is prolonged, the low condition is recognized as a start element and a simulated character is stored or, if a character is being received, the signal elements are garbled. In either event, the line is maintained in the low condition during the stop element interval.

Recalling now that, after the character is stored, flip-flop 110 is reset providing a high signal condition to lead 105 whereby the low signal condition on input lead 221 of gate 222 is removed and the low signal condition on input lead 235 to inverter gate 233 is removed. In addition, character timer 201 provides a negative potential transition to lead 226, which lead extends to the input set gates of flip-flops 212 and 215. If, at this time, noise is being received, lead 103 is in the low signal condition providing an enabling potential to the input set gate of flip-flop 215 via lead 225. At the same time, inverter 102 applies a high signal condition to lead 104 disabling the input set gate of flip-flop 212. Accordingly, the negative impulse on lead 226 is blocked by the input set gate of flip-flop 212 and the flip-flop remains reset and is passed by the input set gate of flip-flop 215, setting the latter flip-flop.

The setting of flip-flop 215 removes the low signal condition provided at output terminal 1 thus impressing a high signal condition on lead 237 which extends to inverter gate 233. The setting of flip-flop 215 also provides a low signal condition at output terminal 0, which low signal condition is passed by diode 223 and lead 221 to inverter gate 222. This precludes the application of the shift register read out pulse to lead 230. In addition, the low signal condition at output terminal 0 of flip-flop 215 is passed by lead 240 to gate 241, enabling the gate.

With gate 241 enabled, the next clock pulse in lead STCL is passed by the gate to set flip-flop 210. This provides a high signal condition to lead 229, as previously described, whereby the previous low signal condition applied to inverter gate 233 via diode 234 is removed. Since none of the input leads of gate 233 is in the low signal condition, a low signal condition is provided at the output thereof and passed through resistor 242 to forward bias diode 243. The setting of flip-flop 210 also applies a low signal condition to lead 231 to enable gates 120 through 127, as previously described, and applies a low signal condition to lead 211 to enable its own input reset gate and the input reset gate of flip-flop 215, as previously described.

When the next successive clock pulse is applied to lead STCL, the pulse is passed through capacitor 244 and diode 243, now forward-biased, to one-shot multivibrator 245. In response to the clock pulse, one-shot multivibrator 245, in turn, applies a low condition signal to lead 246. The low condition signal on lead 246 is then utilized to code output leads 151 through 155 of translator 150 with a character indicating that a garbled or invalid character has been received. As shown in FIG. 1, lead 246 is connected to leads 152 and 153 by way of diodes 158 and 159, respectively, thereby applying the low signal condition to leads 152 and 153, and thus selectively coding leads 151 through 155 with a code character which indicates the reception of an invalid code.

The clock pulse on lead STCL also resets flip-flop 215 and restores flip-flops 110 through 117 to the set condition, as previously described. When the incoming line restores to the idle marking condition, flip-flop 206 is restored to the set condition, as previously described. The circuit is than returned to the initial condition awaiting the reception of the next start element.

If the interference comprises a short hit having a duration less than one-half of a start element, the low condition thereby applied to lead 103 starts element timer 201 in the same manner as previously described. This resets flip-flop 210, as previously described, and starts element timer 202 which produces a pulse at the midpoint of the initial start element and a pulse at the midpoint of each information element. However, since the line hit duration is less than one-half of a start element, the line returns to marking before the first element timing pulse. Accordingly, a marking signal is stored in flip-flop 117 in response to the first element timing pulse.

The subsequent seven-element timing pulses shift the marking signal to flip-flop 110, as previously described, and character timer 201 thereafter restores. The restoration of character timer 201 sets flip-flop 212 if the line is marking, or flip-flop 215 if the line is spacing, and flip-flop 210, in turn, is set. With a marking signal in flip-flop 110, however, lead 105 is in the low signal condition providing a low signal condition to inverter gate 222 by way of diode 220 and lead 221 and to inverter gate 233 by way of lead 235. This precludes the application of a read out pulse to lead 230 and the translator does not read the character stored in flip-flops 110 through 117. Diode 243 is also maintained back-biased, precluding the application of a low condition by way of lead 246 to output leads 152 and 153. Accordingly, no output is provided to output leads 151 through 155 in response to the reception of the line hit.

With flip-flop 219 set, shift register flip-flops 110 through 117 are restored to the set condition and flip-flop 212 or flip-flop 215 is reset. The circuit thus restores to the initial condition.

Translation is also precluded when the start element is lost in the shift register due to a malfunction. In this event, a marking signal is stored in flip-flop 110 at the conclusion of the character. Accordingly, the circuit assumes the same condition as previously described for the situation where a line hit is received. Thus no output is provided to output leads 151 through 155.

Although a specific embodiment of the invention has been shown and described, it will be understood that various modifications may be made without departing from the spirit of the invention and within the scope of the appended claims.

What is claimed is:

1. A serial-to-parallel converter for start-stop code character elements comprising a multistage shift register, receiving means responsive to received code elements for serially applying said elements including said start element to an initial stage of said shift register, means for simultaneously detecting the conditions of said shift register stages, and means jointly responsive to the shifting of said start element to a final stage of said shift register and the reception of the stop element by said receiving means for enabling said detecting means.

2. In a receiver for serial start-stop binary code character elements, a multistage shift register, receiving means for serially applying received binary elements including said start element to an initial stage of said shift register, a plurality of output leads, each of said leads associated with an individual shift register stage, and means jointly responsive to the shifting of said start element to a final stage of said shift register and the reception of the stop element by said receiving means for selectively energizing each of said output leads in accordance with the conditions of said associated shift register stages.

3. In a receiver for serial start-stop binary code character elements, a multistage shift register, receiving means for serially applying received binary elements including said start element to an initial stage of said shift register, timing means responsive to the reception of the start element by said receiving means for timing an interval, a plurality of output leads, each of said leads associated with an individual shift register stage, and gating means enabled in response to the shifting of said start element to a final stage of said shift register at the termination of said timing interval for selectively energizing each of said output leads in accordance with the conditions of said associated shift register stages.

4. A receiver for serial start-stop binary code character elements in accordance with claim 3 including means effective in the absence of the reception of the stop element for disabling said gating means.

5. A serial-to-parallel converter for start-stop code character elements comprising a multistage shift register, receiving means responsive to received code elements for serially applying said elements to an initial stage of said shift register, a translator circuit having a plurality of input leads and a plurality of output leads, means responsive to the shifting of said start element to a final stage of said shift register for selectively energizing each of said input leads in accordance with the conditions of corresponding stages of said shift register, and means effective in the absence of the reception of said stop element when said start element is shifted to said final stage for disabling said energizing means and directly energizing selected ones of said output leads.

6. In a receiver for two condition code character elements, a multistage shift register, receiving means responsive to received code elements for applying said elements to an initial stage of said shift register, a translator circuit having a plurality of input leads and a plurality of output leads, other means responsive to the shifting of a code element having one of said two conditions to a final stage of said shift register, means jointly responsive to said other means and the reception of a code element having the other one of said two conditions for selectively energizing each of said input leads in accordance with the conditions of corresponding stages of said shift register, and means jointly responsive to said other means and the reception of a code element having said one condition for disabling said energizing means and directly energizing said output leads.

7. In a receiver for start-stop binary code character elements, a multistage shift register, receiving means for serially applying received binary elements to an initial stage of said shift register, timing means responsive to the reception of said start element by said receiving means for generating a timing interval, means responsive to said timing means during said timing interval for applying shift pulses to said shift register, a translator circuit having a plurality of input leads and a plurality of output leads, gate means for selectively energizing each of said translator circuit input leads in accordance with the conditions of corresponding stages in said shift register, first circuit means enabled in response to the reception of said stop element by said receiving means at the termination of said timing interval, second circuit means enabled in the absence of said reception of said stop element by said receiving means at the termination of said timing interval, means jointly responsive to the shifting of said start element to a final stage of said shift register and said enabled first circuit means for enabling said gate means, and means jointly responsive to the shifting of said start element to said final stage of said shift register and said enabled second circuit means for directly energizing selected ones of said translator output leads.

8. In a receiver for start-stop binary code character elements, a multistage shift register, receiving means for serially applying received binary elements to an initial stage of said shift register, timing means responsive to the reception of said start element by said receiving means for generating a timing interval, means responsive to said timing means during said timing intervals for applying shift pulses to said shift register, a translator circuit having a plurality of input leads and a plurality of output leads, gate means for selectively energizing each of said translator circuit input leads in accordance with the conditions of corresponding stages in said shift register, first circuit means enabled in response to the reception of said stop element by said receiving means at the termination of said timing interval, second circuit means enabled in the absence of said reception of said stop element by said receiving means at the termination of said timing interval, means jointly responsive to the shifting of said start element to a final stage of said shift register and said enabled first circuit means for enabling said gate means, means jointly responsive to the shifting of said start element to said final stage of said shift register and said enabled second circuit means for directly energizing selected ones of said translator output leads, and means for removing said binary elements from said shift register, said removing means rendered operable by one of said first and second enabled circuit means.

References Cited in the file of this patent

UNITED STATES PATENTS 2,848,709 Jansky et al. ____________ Aug. 19, 1958